(12) United States Patent
Rodriguez

(10) Patent No.: US 9,525,798 B2
(45) Date of Patent: *Dec. 20, 2016

(54) IMAGE-RELATED METHODS AND SYSTEMS

(71) Applicant: Digimarc Corporation, Beaverton, OR (US)

(72) Inventor: Tony F. Rodriguez, Portland, OR (US)

(73) Assignee: Digimarc Corporation, Beaverton, OR (US)

(*) Notice: Subject to any disclaimer, the term of this patent is extended or adjusted under 35 U.S.C. 154(b) by 45 days.

This patent is subject to a terminal disclaimer.

(21) Appl. No.: 14/494,054

(22) Filed: Sep. 23, 2014

(65) Prior Publication Data
US 2015/0104058 A1     Apr. 16, 2015

Related U.S. Application Data

(63) Continuation of application No. 13/149,334, filed on May 31, 2011, now Pat. No. 8,842,875, which is a (Continued)

(51) Int. Cl.
*G06K 9/00* (2006.01)
*H04N 1/32* (2006.01)
(Continued)

(52) U.S. Cl.
CPC .... *H04N 1/32122* (2013.01); *G06F 17/30268* (2013.01); *G06T 1/0092* (2013.01);
(Continued)

(58) Field of Classification Search
USPC .......................................... 382/100, 124–127
See application file for complete search history.

(56) References Cited

U.S. PATENT DOCUMENTS

| 5,432,558 A | 7/1995 | Kim |
| 5,864,681 A | 1/1999 | Proctor et al. |

(Continued)

FOREIGN PATENT DOCUMENTS

WO    WO2012162467    11/2012

OTHER PUBLICATIONS

PCT Int'l Search Report and Written Opinion of the International Searching Authority, PCT/US12/39285 (published as WO2012/162467), Aug. 23, 2012.

*Primary Examiner* — Alex Liew
(74) *Attorney, Agent, or Firm* — Digimarc Corporation

(57) ABSTRACT

Digital watermark encoding—and associated registry transactions—are made transparent to consumers—performed as built-in features of common image processing operations, such as taking a picture, or printing a picture. In one arrangement, a user particularly defines network experiences that a hardcopy image is to invoke. The user may interact with buttons and other controls of a graphical user interface on the touchscreen of a printer to author specific experiences that should be triggered by a hardcopy image—such as launching a related video, playing a recorded audio clip, displaying other images in a story narrative to which the hardcopy image relates, etc. These choices can be made at the time of printing, or the printer can be used as an interface to establish or adjust such network experiences after printing. The printer then attends to interactions with network infrastructure components needed to give the hardcopy print the user-desired functionality. In another arrangement, the content experience triggered by a printed image is authored automatically, e.g., by reference to data mined from the image's online context (e.g., Facebook photo album). A great variety of other features and arrangements are also detailed.

26 Claims, 7 Drawing Sheets

Related U.S. Application Data continuation-in-part of application No. 13/117,026, filed on May 26, 2011, now Pat. No. 8,699,747.

(51) Int. Cl.
  *G06F 17/30* (2006.01)
  *H04N 1/00* (2006.01)
  *G06T 1/00* (2006.01)

(52) U.S. Cl.
  CPC ....... *H04N 1/00* (2013.01); *H04N 2201/3235* (2013.01); *H04N 2201/3261* (2013.01); *H04N 2201/3274* (2013.01); *H04N 2201/3278* (2013.01)

(56) References Cited

U.S. PATENT DOCUMENTS

| | | |
|---|---|---|
| 5,889,868 A | 3/1999 | Moskowitz et al. |
| 6,122,403 A | 9/2000 | Rhoads |
| 6,125,192 A | 9/2000 | Bjorn et al. |
| 6,512,837 B1 | 1/2003 | Ahmed |
| 6,522,770 B1 | 2/2003 | Seder |
| 6,556,688 B1 | 4/2003 | Ratnakar |
| 6,563,935 B1 | 5/2003 | Echizen et al. |
| 6,590,996 B1 | 7/2003 | Reed et al. |
| 6,671,407 B1 | 12/2003 | Venkatesan |
| 6,695,206 B2 | 2/2004 | Ross |
| 6,947,571 B1 | 9/2005 | Rhoads et al. |
| 6,952,485 B1 | 10/2005 | Davidson et al. |
| 6,970,886 B1 | 11/2005 | Levy |
| 7,010,144 B1 | 3/2006 | Davis et al. |
| 7,111,168 B2 | 9/2006 | Lofgren et al. |
| 7,206,430 B2 | 4/2007 | Pelly et al. |
| 7,424,131 B2 | 9/2008 | Alattar et al. |
| 7,450,734 B2 | 11/2008 | Rodriguez et al. |
| 7,480,393 B2 | 1/2009 | Gustafson et al. |
| 7,653,251 B2 | 1/2010 | Dei et al. |
| 8,300,884 B2 | 10/2012 | Sharma et al. |
| 8,332,478 B2 | 12/2012 | Levy et al. |
| 2001/0040987 A1 | 11/2001 | Bjorn et al. |
| 2002/0090110 A1 | 7/2002 | Braudaway et al. |
| 2002/0120849 A1 | 8/2002 | McKinley et al. |
| 2002/0154144 A1 | 10/2002 | Lofgren |
| 2002/0176116 A1 | 11/2002 | Rhoads et al. |
| 2004/0049401 A1 | 3/2004 | Carr et al. |
| 2004/0081338 A1 | 4/2004 | Takenaka |
| 2004/0213437 A1 | 10/2004 | Howard et al. |
| 2005/0052695 A1 | 3/2005 | Fukunaga et al. |
| 2005/0169498 A1 | 8/2005 | Choi et al. |
| 2006/0041591 A1 | 2/2006 | Rhoads |
| 2006/0062426 A1 | 3/2006 | Levy et al. |
| 2006/0115108 A1 | 6/2006 | Rodriguez et al. |
| 2006/0204032 A1 | 9/2006 | Nakamura et al. |
| 2006/0239501 A1 | 10/2006 | Petrovic et al. |
| 2007/0030999 A1 | 2/2007 | Hyakutake et al. |
| 2007/0070429 A1 | 3/2007 | Hein et al. |
| 2007/0118794 A1 | 5/2007 | Hollander et al. |
| 2007/0156726 A1 | 7/2007 | Levy et al. |
| 2007/0266252 A1 | 11/2007 | Davis et al. |
| 2008/0037825 A1* | 2/2008 | Lofgren et al. ... G06F 17/30241 382/100 |
| 2008/0174570 A1 | 7/2008 | Jobs et al. |
| 2010/0048242 A1 | 2/2010 | Rhoads et al. |
| 2010/0054601 A1 | 3/2010 | Anbalagan et al. |
| 2010/0103277 A1 | 4/2010 | Leebow |
| 2010/0150434 A1 | 6/2010 | Reed |
| 2010/0262488 A1 | 10/2010 | Harrison et al. |
| 2010/0263020 A1 | 10/2010 | Harrison et al. |
| 2011/0161086 A1 | 6/2011 | Rodriguez |
| 2011/0214044 A1 | 9/2011 | Rhoads |
| 2012/0005224 A1* | 1/2012 | Ahrens et al. ......... G06Q 10/10 707/769 |

\* cited by examiner

When this photo is viewed:

- [✓] Play this audio: [BROWSE]
- [ ] (and) present on the screen this [image / video / web page]
- [✓] (and) overlay this text message: *A day we won't soon forget!*

---

After this many seconds: [5] ~32

- [✓] Continue audio as before, or
  - [ ] Play this audio:

- [✓] Continue image/video as before, or
  - [ ] Present on the screen this [image / video / web page]

- [ ] Continue text as before, or
  - [✓] Overlay this text message: *If we can remember it...*

- [ ] Add more? ~34

---

- [ ] Store as a template? ~36

FIG. 2

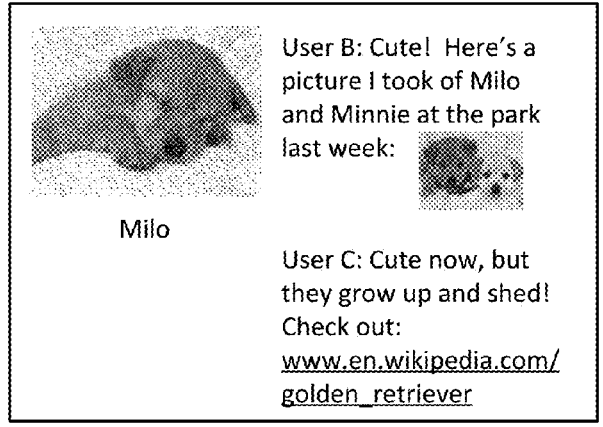

| Image ID | Metadata Address | Submitted By | Copy? |
|---|---|---|---|
| 98D28D478C34 | https://www.facebook.com/photo.php?fbid=10150259830481340 | UserA | Original |
| 98D28D478C34 | http://www.flickr.com/photos/rkleine/4302648154/ | UserB | No |
| 98D28D478C34 | http://en.wikipedia.org/wiki/Golden_retriever | UserC | No |
| 98D28D478C34 | http://en.wikipedia.org/wiki/File:AmericanGoldenRetriever.png | UserC | No |
| 98D28D478C34 | http://en.wikipedia.org/wiki/File:Golden_Retrievers_dark_and_light.jpg | UserC | No |
| 98D28D478C34 | http://en.wikipedia.org/wiki/File:GoldenRetrieverPuppy.jpg | UserC | No |
| 98D28D478C34 | http://www.goldenretriever.org/dog.jpg | Crawler | Yes |
| . | . | . | . |

IMAGE-RELATED METHODS AND SYSTEMS

RELATED APPLICATION DATA

This application is a continuation of application Ser. No. 13/149,334, filed May 31, 2011 (now U.S. Pat. No. 8,842, 875), which is a continuation-in-part of application Ser. No. 13/117,026, filed May 26, 2011 (now U.S. Pat. No. 8,699, 747).

RELATED TECHNOLOGY

The present technology relates to that detailed in various of the assignee's previous patents and applications, including U.S. Pat. Nos. 6,122,403, 6,590,996, 6,947,571, 6,952, 485, 6,970,886, 7,010,144, 7,450,734 and 7,480,393; and patent publications 20060062426, 20070156726, 20070070429, 20100150434, 20100048242 and 20110214044.

The present technology expands, in some respects, on technology detailed in the above-noted documents. The reader is presumed to be familiar with such previous work, which can be used in implementations of the present technology (and into which the present technology can be incorporated).

TECHNICAL FIELD

The present technology concerns improved methods and systems for interacting with imagery, such as by providing printed photographs with enhanced network functionality.

BACKGROUND AND SUMMARY

In earlier patents, the assignee detailed how imagery can be encoded with hidden digital watermark data. Such data can be used, e.g., to tag a photograph with the name of the photographer and other identification data. This identification data is used, in some embodiments, to link to associated web destinations. For example, a photographer may watermark photographs with an identifier which, through an intermediate registry, links to the photographer's web site.

Digital watermark technology is also used to encode printed news and entertainment media, such as magazines and newspapers, with steganographic identifiers that point to associated network resources. Thus, for example, a smartphone may capture imagery from a news story photo, decode the watermark identifier, pass it to a registry, and receive a link to a web site devoted to late-breaking developments relating to that news story.

While such technology has been adopted by many commercial enterprises, adoption of digital watermarking technology by consumers, per se, has been limited. Previously, there has been no system for watermark encoding imagery, and for interacting with an associated registry database, that has been simple enough for widespread home use.

In accordance with one aspect of the present technology, digital watermark encoding—and associated registry transactions—are made transparent to consumers—performed as built-in features of common image processing operations, such as taking a picture, or printing a picture.

In an illustrative embodiment, a user particularly defines network experiences that a hardcopy image is to invoke. For example, the user may interact with buttons and other controls of a graphical user interface on the touchscreen of a printer to author specific experiences that should be triggered by a hardcopy image—such as launching a related video, playing a recorded audio clip, displaying other images in a story narrative to which the hardcopy image relates, etc. These choices can be made at the time of printing, or the printer can be used as an interface to establish or adjust such network experiences after printing. The printer then attends to interactions with network infrastructure components needed to give the hardcopy print the user-desired functionality.

In other embodiments, the content experience triggered by a printed image is authored automatically, e.g., by reference to data mined from the image's online context (e.g., Facebook photo album). In still other embodiments, hybrid approaches can be employed—with some responses defined automatically, and others defined by user action.

The foregoing and additional features and advantages of the present technology will be more readily apparent from the following detailed description, which proceeds with reference to the accompanying drawings.

BRIEF DESCRIPTION OF THE DRAWINGS

FIG. 2 shows a user interface through which a user can define a content experience that will be presented to other users who capture imagery from a printed object.

FIG. 6 show shows a sample social networking site web page about the initial photo image of FIG. 5.

FIG. 8 shows a data structure/table maintained by an illustrative registry, detailing information related to the initial photo image of FIG. 5.

DETAILED DESCRIPTION

With the proliferation of camera-equipped smartphones, the number of photographs taken by consumers has surged. Users can readily post their phone-captured imagery to Facebook and other online sites, and rich narratives and content experiences can develop around such postings—e.g., with comments and links contributed by the user's social network friends. When such photographs are printed, however, this wealth of additional information is lost; just the bare pixels remain.

In accordance with one aspect of the present technology, a picture does not become divorced from all of its extra information by printing. Instead, the photograph is printed with information that automatically enables linking back to its abundance of online annotations and associated content.

Figure 1:
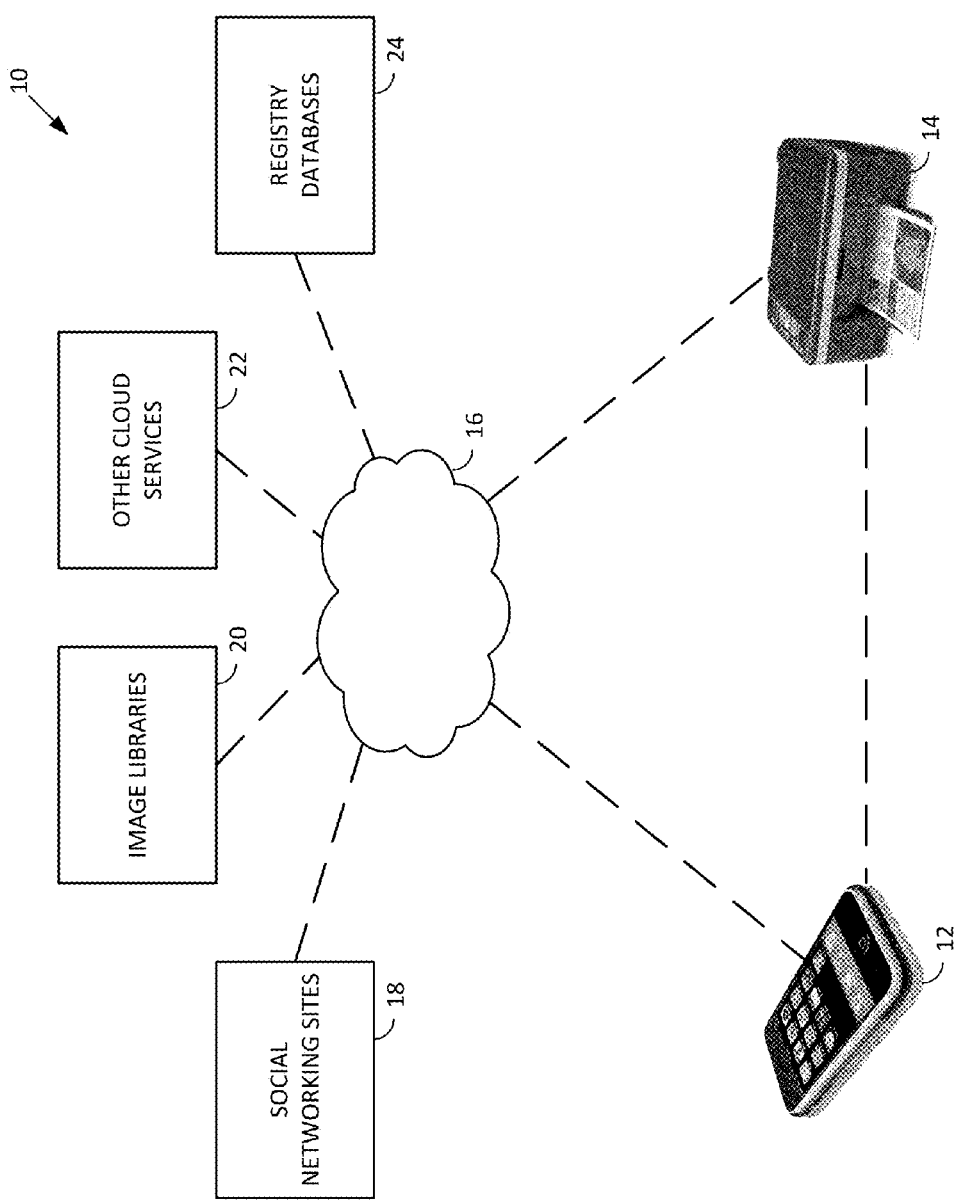
FIG. 1 show components that may be used in certain embodiments of the present technology.

FIG. 1 shows an illustrative environment 10 including a mobile phone 12, a printer 14, and a cloud 16 of online resources. For example, the cloud encompasses Facebook and other social networking sites 18. Similarly, it includes online image repositories 20, such as Flickr, Picasa, OFoto, SnapFish, Google Images, etc.

Consider a Facebook photo page. While each such page includes an image, what makes it really interesting is the metadata around it: who posted it (Ethan); when it was taken (Nov. 20, 2010); and where it was taken (lat/long, or city name). Still more interesting may be the tags and comments authored by the image owner, social network friends and other viewers. Such text annotations may detail the circumstances when the photo was taken (e.g., party in dorm after the college won the big football game against the cross-state rival team); who was there (Ben, David, Maria, Christie, Ryan and Mitch—each labeled); what happened before and after the picture was taken (a cross-state friend called Maria, and the roomful of people sang the team's fight song to her on speaker phone); online discussions triggered by comments relating to the photo—but then diverging into ancillary topics, etc., etc. (Such information may be termed crowd-sourced commentary.)

(Also relevant may be the temporal context of the image relative to other stored images in a Facebook collection (album), e.g., with a group of pictures all relating to a common event. Relatedly, visual similarity of one image to a second image may allow metadata stored in connection with the second image to be used with the first. These two attributes are examples of "semantic proximity").

A visitor to this Facebook page may print the picture for posting on a dorm bulletin board. When the picture is printed, it includes a hidden digitally-watermarked identifier that serves as a link back to the original Facebook page. When another student later views the printed picture on the bulletin board using a mobile phone, the phone loads the Facebook page so the student can review all of the crowd-sourced commentary.

By such arrangement, the richness of the photograph's network metadata is preserved—even after printing. Moreover, the online information presented via the mobile phone is real-time information, including the latest crowd-sourced annotations. Thus, the printed photo may yield a different experience today than yesterday, due to the addition of more commentary.

Particular implementations can take various forms. The image can be watermarked when it is captured, when it is uploaded from the camera device to another repository (e.g., to a personal computer); when it is posted at Facebook; when it is first viewed at Facebook; when it is sent to print, etc. Similarly, the watermarking operation can be performed by any device in the data flow (or distributed between plural such devices), e.g., the digital camera or mobile phone 12; the personal computer; a router in a home network; a server at Facebook; another server in the cloud (e.g., a Google print server 22); the printer 14 itself, etc.

The identifier that is watermark-encoded into the printed picture is 48 binary bits in a particular embodiment. Such a payload allows for the unique identification of many trillions of images. Larger or smaller identifiers can of course be used.

Alternatively, the identifier can be of another form, such as a Digital Object Identifier (DOI) or other Corporation for National Research Initiatives (CNRI) "handle," or an IPv6 identifier (or part thereof).

In an exemplary embodiment, the identifier is issued by an "issuing authority," which may be a party such as Verisign, a domain registrar, ICANN, etc. The issuing authority can interact with one or more registry databases 24 that associate the identifiers with other information, such as links to relevant sources of metadata, etc.

When an image is first watermarked, a request is typically made to an issuing authority for issuance of a new identifier. The authority issues an identifier, and logs related information in the registry database. This related information can include linking data, if available. Alternatively or additionally, linking and other metadata may be added or revised later—so-called "late binding." (In some embodiments, the registry may consult rules to determine who may request identifiers, or add information to the database.)

When the watermarked image is thereafter imaged by a mobile phone camera, or is otherwise accessed, the registry database is again contacted—this time to retrieve one or more items of metadata. (As with image watermark encoding, the watermark decoding operation can be performed by any device(s) in the system.) A URL link obtained in such fashion can be activated automatically, or at a user's election, to obtain crowd-sourced commentary and other metadata related to the image.

First Particular Embodiment

Increasingly, printers are web-connected and offer browsing capabilities. The Hewlett-Packard Photosmart eStation Printer Series model C510, for example, includes an Android-based tablet computer for its control panel, providing full tablet computer functionality.

The C510 printer includes software (an HP tablet "app") designed to print photos from Facebook—excerpting from the web page just the pixel data for printing, and automatically sizing the image for the available print substrate, etc. (Similar functionality is available from "PrintApps" that run on WebOS on a variety of Hewlett-Packard printers.) In accordance with this aspect of the present technology, when a user instructs the printer to print a Facebook image, the Facebook app running on the printer 14 contacts the registry 24 and requests an image identifier. With the request the printer provides the registry a link to the Facebook page from which the image is being excerpted.

The registry responds by returning a newly-assigned identifier to the requesting printer, and logging the received link in a new database record. (Storing associated metadata with the identifier at the time of its issuance may be regarded as "early binding.") Meanwhile, the printer retrieves the user-identified image data from the Facebook page. The printer then resizes the received image data for the requested printing, digitally encodes the identifier into the resized image, and prints the requested photograph in hardcopy form.

The resulting printed photograph is logically bound to the associated Facebook webpage, through the record in the registry database.

Note further that there was no express user involvement in the metadata linking. The user simply printed a photograph, and the watermark-related operations ensued automatically. (Such functionality is normally enabled by default, but may be disabled by a parameter in the User Preferences setup of the printer, if desired.)

Second Particular Embodiment

One of the ways that the second embodiment differs from the first is that the second embodiment allows the user to particularly tailor the experience that the printed image is to invoke (whereas, in the first embodiment, the experience is authored automatically, e.g., by a link to the original Facebook page).

In a particular implementation of this second embodiment, the printer control panel (e.g., the touchscreen of the Hewlett-Packard C510 printer) presents an authoring user interface 30 (FIG. 2) that allows the user to specifically define a multimedia presentation including text, audio, imagery, and video.

The top portion of the user interface (UI) 30 allows the user to indicate—by tapping check boxes—whether the hardcopy photograph should trigger presentation of audio, image/video/web page (selected by tapping), and/or text. If audio or image/video is selected, a dialog box opens thru which the user can navigate to the desired content, e.g., on the internet, or locally. If text is selected, a touch-screen keyboard appears through which the user can enter the desired text message. (If the user navigates to local content, the mobile phone automatically copies such content from the local address to an online repository, such as the user's MobileMe, Picasa or SnapFish account, to allow access by the others.)

The illustrated UI allows the user to script a presentation that evolves with time, by stating how long (in seconds) the just-indicated content should be presented, before transitioning to other content. If this option is selected, a middle portion of the UI becomes active (it may be greyed-out unless/until the user enters a time interval in box 32).

The middle portion of the UI is similar to the top portion—here allowing some of the audio, image/video/web page, and/or text from the earlier-detailed presentation to continue, while allowing other of such content to be changed.

If the user taps a check box 34, the UI scrolls up to allow entry of still additional presentation details, e.g., by replicating the just-discussed middle portion for entry of data about a third temporal phase of the presentation. In like fashion, the user can author fourth and further phases.

At the bottom of the screen is a check box 36 asking whether the user wants to store the just-entered data as a template—which can then be recalled as a starting point when scripting the content experience for other hardcopies of the user's photographs. If the user taps this box, a dialog box opens asking for the user to name the template. Thereafter, when the UI 30 is presented, the user is first asked whether the presentation it should be pre-configured in accordance with one of the user's stored templates.

The UI 30 may be invoked at the time of initial printing. Alternatively, it may be invoked post-printing, to then define (or edit) the associated network experience invoked by the hardcopy print.

(It will be recognized that the FIG. 2 arrangement is exemplary only. Implementations are likely to differ in form and vary in function. While disclosed in the context of a printer, a similar authoring capability may be provided by software on the user's mobile phone.)

Although not shown in FIG. 2, the user may further tailor the online experience so that it varies depending on the particular person viewing the photograph. If the user's roommate views the picture with his mobile phone, one set of content may be presented. If the user's mother views the picture with her mobile phone, a different set of content may be presented. (If the user's mother's native language is Spanish—as indicated by profile information provided by her phone, or by an associated online profile—then any text included in the presentation may be machine-translated into Spanish.)

In common practice, the experience invoked by a hardcopy print is initially be defined automatically by the system, without any creative user involvement (as in the first embodiment). With that experience as a starting point, the user then employs the UI 30 of FIG. 2 to edit this initial experience—yielding a user-customized experience.

Third Particular Embodiment

In another embodiment a user sends an image to print from a mobile phone 12. The image may have been just-captured (and stored only on the phone), or the user may have navigated to it online, using a phone web browser or other phone app software.

One way to print from a mobile phone is through use of Google's Cloud Print service 22. This service is provided by Google to allow any web, desktop or mobile application to print to any printer, using Google as an intermediary.

In particular, Google provides a web-based, common print dialog (web UI) or API, which the application uses to send a print job to a designated printer. Printers are setup in association with Google accounts, and may be shared with other users (akin to Google Documents). The capabilities of each printer are stored by Google, and are reflected in the UI, e.g., enabling users to set print preferences. Software executing on Google servers pre-processes imagery as would a conventional printer driver, rendering the received data into image form, and providing signals appropriate to the receiving printer. (The Google service may additionally perform operations such as color correction, down-sampling, and adding title overlays such as date/time/GPS location.) Even old, legacy printers can be accessed through this service, by using an attached computer as a proxy server. (In such case, the phone communicates with Google, which communicates with the computer, which communicates with the printer. With more modern computers, Google communicates directly with the printer—using the printer's own IP address.)

Consider a user who is on vacation in Italy, and who has used a smartphone to capture an image of a traveling companion posed as if supporting the Leaning Tower of Pisa. The smartphone automatically associates a variety of metadata with the image using EXIF header data, e.g., date, time, GPS location, exposure and flash parameters. Other parameters may also be stored automatically, such as sensor data from the instant the image was captured (accelerometer, gyroscope, magnetometer, etc.) The user may contribute still other data—such as a text caption to recall other events of the day. The name of the person in the photo may be added by the user, or may be annotated automatically by facial recognition software in the phone, or invoked by the phone from a cloud-based service. Still other context information may be harvested from other data sources. For example, the user's personal calendar may have a stored itinerary for the vacation, including a textual description of the day's activities, restaurants to be visited, and the hotel where the travelers are lodged. Likewise, GPS coordinates can allow identification of other images taken from the same locations (e.g., on Flickr), and metadata from those images may be extracted for use with the user's images. (Such techniques are further detailed in published application 20100048242.)

The user may wish to print a copy of the image at a public printer at the hotel in the evening, and mail it as a postcard to friends who are working back at the office. The printer is accessible to guests through the Google Cloud print service. The user presses "Print."

Software in the phone responds by transmitting the image, and some or all of the associated metadata, from the phone.

The metadata is routed for archival storage at a cloud service, such as SnapFish, Picasa, or an Apple MobileMe account—with or without the image data. The phone may send the metadata directly to such destination, or the Google Cloud Print service can attend to this task.

The phone sends the image data to the Google Cloud Print service, together with an indication of the destination printer. In this embodiment, the Cloud Print service solicits a watermark identifier from the issuing authority 24, and also provides a link to the archival repository where the metadata is stored. The issuing authority issues an identifier, and stores the identifier in the database—together with the provided link to the associated metadata.

Upon receipt of the watermark identifier, the Google Cloud Print service performs a watermark encoding operation as part of its print job preparation, so that the print data sent to the hotel's printer includes the embedded identifier.

Again, the result is the printing of a hardcopy photograph that is linked to all of the associated metadata. Again, this functionality is provided without any user intervention or expertise; all was automatic. And this time such functionality is achieved without any intelligence in the printer. (Indeed, old legacy printers can be used in this fashion.) The watermark encoding is performed in the cloud—as the data is en route from the phone to the printer.

Fourth Particular Embodiment

The foregoing two embodiments provided imagery from the "cloud" to the printer. But this need not be the case. In a further embodiment, the mobile phone 12 provides imagery directly to the printer 14—such as by WiFi, Bluetooth, etc.

As in the above-described second embodiment, metadata for the subject image is desirably copied to an archival site, such as an online photo repository—in this case by the phone 12. The phone then sends a request for an identifier to the issuing authority (together with address data for the archived metadata), and then watermarks the imagery with the received identifier. The watermarked imagery is then transmitted, e.g., wirelessly, to the printer for printing as a hardcopy print.

Alternatively, the watermark encoding can be performed by the printer. In this case, a pointer to the archived metadata is provided to the printer along with the image data, and the printer attends to obtaining an identifier from the registry 24, and to providing a link to the archived metadata for storage in the registry database.

Another variant embodiment splits the identifier-procurement and identifier-embedding operations between the phone and the printer. That is, the phone attends to interaction with the registry (requesting an identifier, and submitting metadata linking information for storage in the registry database). The phone transmits the watermark identifier (received back from the registry) to the printer. The printer then embeds the provided watermark identifier in the provided imagery, and produces a hardcopy print.

Authentication

Policy and rules may be used in determining when, and who, can perform binding of a watermark identifier to network assets (either at time of watermark embedding, late-binding or changing of binding.) The act of doing so can be considered an extension of the authoring act, and as such the author of the image may want to preserve the right to do the binding themselves or explicitly delegate the right to others. One aspect of enabling policy and rules is the creation of roles within the system wherein each component or actor in the system has a verifiable identity.

Many devices have unique identities (MAC address, UDID on mobile devices, etc.) that can be utilized for this purpose. User identity can be created and managed directly through existing services, such as Microsoft Passport, or by leveraging existing identity mechanisms such as a user's Facebook account, Gmail login, etc.

In one such scenario, an assigned identifier (watermark ID) within the registry database can also contain one or more fields that link the identifier to a user identity provided by external services. Once such a linkage is made, the registry database can rely on these services to manage the authentication process, thus allowing the registry database to provide binding services per stored policies or rules that define the roles of the various actors and system components.

Such identity can inform how all embodiments defined herein are implemented to reflect the wishes of the users and provide more security to the system.

For the first embodiment, the authentication of the user is implicit, as the user had to have access to their Facebook page in order to retrieve the image and print it locally. In such a case, the registry database may be setup to singularly trust requests originated from authenticated users of Facebook. While simplifying the embodiment, the reader will appreciate the limitations this would place on adoption of such a system, by requiring all users to have Facebook accounts.

Setting aside this limitation for a moment, imagine a future embodiment of the HP PrintApp software in which the user is able to access their Facebook page generally as opposed to only a specific photograph within their album. In such circumstance, the user might just as likely select a picture that originated from a friend's page to print.

Currently there is no prohibition against printing any imagery encountered within Facebook, or for that matter within many other social networking or photo sharing sites. The act of binding a photograph to a digital destination, however, is akin to creating a digital identity for the photograph—something the author may wish to control.

At the point that the user prints a photograph of which they are not the author (proprietor), the request for a Watermark ID and binding of said ID to a service may be subjected to rules defined by the author. Enforcement of such rules may occur at different locations within the system.

The Facebook print app may, upon the user's request to print a friend's photograph, notice that the user is not the author of the photograph and completely forego the request for an identifier, watermarking and binding operation. A more evolved embodiment involves the print app querying Facebook for what rules to apply in such a scenario, with the rules likely informed by the author's desires for the photograph. In another embodiment, the author may grant permission to the user to do so, or might require that the watermarking and binding to be done to a specified destination (URL) as a condition of embedding.

As an example of the last scenario, the author may want to ensure that wherever their pictures travel, that they are always connected back to the appropriate Facebook page that contains compelling metadata about the picture. A grandparent may see a picture on their Facebook page of their Grandson at a first baseball game of the season, authored (picture taken and uploaded) by their daughter, and decide to print the picture. The daughter, knowing the grandparents' keen interest their grandson's baseball stats for the year, may enforce a rule that—when printed—the picture should always link to the grandson's stats page that contains additional details of the season, such as the game schedule, comments from teammates, or additional media (pictures and video).

Returning to the enforcement of such rules, it should be made clear that enforcement may occur at the print app as described above, within Facebook itself, at the registry database, or even by a third party rules and policy service.

In the third embodiment, the Google print service may act as the source of user identity, and enforce rules related to the wishes of the author of the photograph. A user with a smartphone that has navigated to a Picasa photo album, for which they are not the owner, may identify a picture that they would like to print. At such time, the Google print service may inquire as to the policy set by the author of the photograph (the author being identified through the Google user ID associated with the creation of the photo album). Similar to the Facebook example above, the Google Print Service may then enforce the rules directly.

In both examples, pre-existing user identification mechanisms provided by Facebook and Google respectively are utilized, indicating that users may have multiple identities provided by different services, all of which need to be understood by the registry database or system responsible for enforcing policy.

An approach to managing a user's multiple potential identities is to have a central authentication service associated with the registry database. At initial setup, the user links the user's identities from related services that may issues a request for an identifier, or that may wish to do binding on the user's behalf. Doing so would allow the registry database to be independent of any specific user identity provider as originally described above.

Once set in place and enabled with well understood API's, all the scenarios and embodiments defined herein can leverage policies and rules to automate and simplify the requisition and binding of IDs.

Device Domain Construct of Identity

Another embodiment for ensuring that the registry database is acting in accordance with the author's wishes is to use a domain construct where only trusted devices within the domain of devices owned by the author are allowed to make requests.

A user may associate devices with their identity as managed by the central authentication service defined above. The devices may consist of phones, printers, laptops, game systems, internet connected TVs, etc.

Once associated, the device ID can be used to inform when and how rules should be applied. As an example, a simple rule an author might setup is that only requests from their trusted devices are able to request identifiers and perform binding.

If the author navigates to the author's public Picasa album from their phone, uniquely identified by its UDID, then the author has the ability to perform watermarking and binding. If any other phone (with a different UDID that is not within the author's domain of registered devices) attempts to do so, watermarking and binding will not be allowed.

General Comments

As just detailed, the system may be configured so that different users enjoy different privileges. For example, if an image was captured by the mobile phone of User A, then the system may allow only User A to author a corresponding content experience for that photograph. User A may use this privilege to define an initial content experience, but may expressly authorize the system to accept edits from social network "friends" of User A. User A may further specify that certain elements of the original online experience should not be changed. User A may also require the system to seek approval from User A before any edits made by social network friends are given effect.

Alternatively, User A may not impose any limits on who can author or edit content experiences for images captured by User A. Naturally, a great number of other control and privileges attributes may be established.

Typically, such conventions are recorded in a Preferences file (e.g., stored in the registry database) that User A can edit. Such Preference file is initially configured with default parameters.

Similarly, the system may be configured so that different content experiences are rendered to different users. User A may define two or more classes of audience members—and specify, e.g., that certain online content should be omitted when responding to certain classes, or that different content be substituted. User A may further specify that the online content experience may depend on parameters determined—at the time of rendering—about the viewer (e.g., native language, as indicated by online profile accessed using an ID provided from the user's device).

Some classes may be defined by lists of particular individuals. Others may be defined by one or more attributes. Exemplary classes include: (1) self; (2) Kate Middleton; (3) social network friends having an age within five years of User A's age; (4) other social network friends; (5) everyone else.

System control/privilege attributes and responsive behaviors are thus commonly based on confirmation of identity, e.g., who a user is, what devices the user customarily uses, what images were captured with that user's devices, etc. A variety of cryptographic technologies are known to establish reliable online identities, to associate particular users with particular devices, and to associate particular content with particular users/devices. The artisan will be familiar with such technologies (which include, by way of example, hashing, public/private key encryption, digital signatures, etc.).

Some such technologies allow users to be authorized as members of a certain class, while still keeping their exact identities anonymous. Anonymous viewers may be regarded as a distinct class by User A, who may tailor content to be rendered to such users accordingly.

Similar user identification/authentication may be required in order to access certain of the online content presented when a hardcopy print is imaged. For example, if a hardcopy image links to crowd-sourced commentary about the image from a user's Facebook page, then viewers need access to that Facebook page. Facebook has protocols allowing limited access to Facebook-posted content without signing-in with a Facebook account, and such protocols can be employed to enable public access. Alternatively, the software may be arranged to that the viewer's mobile phone automatically presents Facebook credentials to retrieve such content, so that Facebook authorizes the needed access.

In all of the embodiments detailed herein, late binding of the metadata can be employed. That is, the registry can issue a watermark identifier without storage of associated metadata in the database, and such metadata can be associated with the identifier at a later time. (Metadata can always be updated later, as old data needs revision, or as other information becomes available.)

In some embodiments, the user is queried—at the time of printing—whether they would like the hardcopy photograph to link to an online destination. Preference settings stored in the printer, phone, or Google Cloud Services account, may establish—as default behavior—that such a query should be presented whenever a photograph including a watermark is to be printed, if the watermark is found to have no associated linking information stored in the registry database 24. (The printer can contact the registry database to check for the absence of associated linking information, or the mobile phone, a Google server, or another device can perform such checking.) Such a query is typically presented to the user via the user interface of the phone, or via the user interface of the printer.

Many printers have memory card readers, for receiving images stored by camera devices to such cards. The embodiments detailed herein can naturally use such physical media movement to transfer data from camera devices to printers or other devices. In such embodiment, the memory card may contain rules and data that instruct the printer on how to watermark, print, and upload the photos and associated metadata to the cloud. Such information on the memory card may be prepared either by the camera (e.g., firmware), or by a computer.

While embodiments detailed above reference the printer undertaking certain actions, it will be understood that it is typically software on the printer that is so-acting. While the HP PrintApp is one example of such software, there is no reason that the detailed functionality cannot be performed by other software, such as firmware, drivers, etc. Indeed, such functionality can be implemented in hardware, if desired in a particular embodiment.

Most of this specification contemplates that metadata associated with a printed photograph is displayed on a screen of a mobile phone or other device that images the photograph. In some embodiments, however, printing of the photo could include printing of some or all of the associated metadata. Such printing could either be on the photo, or to the side/beneath/around. (For example, an 8.5"×11" page may be printed with a 4"×6" in the center, and comments presented in the surrounding border.) The particular layout can be defined by the user, e.g., with an authoring UI akin to UI 30 of FIG. 2. By such arrangement, a user could print a photograph and include all the Facebook comments that friends authored—for enjoyment even without a mobile phone.

Online authoring tools are known from other services, such as Hallmark and Evite. These web sites provide dashboard UIs that allow a user to craft a particular web displays that are presented to visitors of the user's online cards/event invitations. Similar constructs and principles can be employed in authoring tools for creating online experiences associated with hardcopy printed documents, e.g., employed in the UI 30 of FIG. 2.

In some instances, the established Hallmark and Evite authoring tools are employed by a user to author a particular online experience. The behavior of a watermarked hardcopy document can then be set, by a link stored in a routing table at the registry, to direct viewers of the document to the user-authored Hallmark or Evite online experience.

In like fashion, other online destinations and businesses may be involved in the "payoff" delivered to viewers of watermarked imagery. After sensing a hardcopy picture, for example, the registry may have data causing the viewer's mobile phone to present an audio/image/text experience, after which the phone concludes by linking to an online florist site, where the viewer may make a purchase, or redeem an electronic coupon that is delivered as part of the online experience.

As still another example, a printed invitation to a neighborhood book club gathering may cause viewers' phones to link to the sender's Delicious social bookmarking website. There, viewers can tap on links to different book reviews, author biographies, etc., chosen by the sender, relating to that month's book. Thus, watermarked documents can serve as a portal to a variety of web destinations, which the document proprietor can customize to deliver a desired experience.

Digital watermarking technology, and its use to associate network resources with imagery, is detailed, e.g., in the patents referenced in the Related Technology section of this disclosure. In some embodiments, a digital watermark encoder (e.g., in a printer or elsewhere) can include an image classifier to identify different classes of images, e.g., text (dark on light background); text (light on dark background), tinted content, natural color imagery, limited color palette imagery, black and white imagery, etc. The watermark encoder can apply different watermarking parameters (e.g., embedding strength), or methods (e.g., chrominance versus luminance watermarking), in correspondence to the particular class of imagery identified by the image classifier.

Additional functionality can be provided, in some embodiments, by providing a thumbnail of the image, and/or an image fingerprint, to the registry (or an associated data structure) for storage. Such data allows the registry to discern whether an identifier has already been assigned for an earlier instance of that particular image—even if one image differs from the other in small respects, such as by resizing, or with color correction. If an earlier instance is noted, the registry may return the identifier earlier-assigned back to the requesting device. Alternatively, a new identifier can be issued, and the registry can make an entry in its database record for one or both instances of the image, to note that another instance of that image was issued ID such-and-such.

If a device (e.g., a printer) is involved in printing multiple copies of the same image, at one time, it may request an identifier for the first copy, and then use the same identifier for all identical copies in the print job—without further involvement of the issuing authority. (The device may inform the issuing authority of its action, i.e., that multiple copies of a given image with the same watermark payload have been printed.)

While a table structure (e.g., a routing table) can be employed to associate one or more URLs (and/or other data) with each assigned identifier, other implementations can employ semantic assertions, such as RDF triples. For example:

98D28D478C34 HasOwner JohnSmith458
98D28D478C34 HasTextMetadata Milo
98D28D478C34_Milo HasURI https://www.facebook.com/text.php?fbid=10150259830481340
98D28D478C34 HasImageSetCompanion https://www.facebook.com/photo.php?fbid=1015025983048134
98D28D478C34 HasImageFingerprint 69F977CDE1FCB6A9EAD8C2
98D28D478C34 HasIssuanceDate May 24, 2011
98D28D478C34 HasSubmitterPublicKey 6D1CC127C49

Metadata associated with an image can include other images (or videos) that are related. For example, if a user uploads a series of images to an online repository, and all the images were captured on the same date, and within a defined interval of time (e.g., two hours), they may be assumed to relate to each other. Thus, metadata for one image may include the other images in the set (and their respective metadata).

Similarly, if images were captured at the same geographic location, relationship again may be inferred. (A vacationer may return to Old Faithful repeatedly, years apart. Yet by the common geolocation, such images can be related.)

Images may also be found to relate to each other due to common subject matter, as indicated by visual similarity. For example, facial recognition may find that two images in a user's Facebook photo collection depict the same person—despite being stored in different albums, and have been taken at different places and times. Other object recognition techniques (e.g., image fingerprinting) can be employed to find common subject matter between images. Again, once related images are found, metadata can be shared between them. (For more on this topic see, e.g., the assignee's patent publication 20100048242.)

As a particular example, consider two families who take a vacation together. The vacationers may have, between them, multiple mobile phone cameras, digital cameras, and video cameras. Several members of the group may each take pictures of the same object, e.g., a sailboat on which they take an afternoon trip. Each person may post their own pictures/videos to their own respective Facebook pages (or other online repositories). Yet by the common geolocation, and common date/time, these pictures can all be associated together. Further, by use of image fingerprinting, or other object recognition technologies, the photos of the sailboat may all be identified. A merged collection of sailboat pictures may thereby be virtually assembled.

The collection may be reviewed—by a member of the group, or automatically—to select a representative assortment of good images for printing in a booklet form, as a trip memento. (An automated technique can consider technical merits of exposure and focus, and select images that have a diversity of poses and scales.) The booklet can include a distillation of textual comments from all of the images in the collection. (Again, the distillation may be manually assembled, or automated techniques can be used. For example, a collection of textual comments can be machine-analyzed to identify redundant words and phrases. The most repeated words/phrases are likely the most relevant descriptors of the sailboat and the event. A few comments including the repeated words/phrases can be prioritized among the comment metadata, while other repetitions can be removed. The automated technique can also identify infrequently used words/phrases, and include these as well—since these may be particular to that sailboat and event.) The booklet can be formatted (by human direction, or automatically) print the distilled comments around the margins of the selected pictures.

The foregoing examples are techniques based on semantic proximity.

In the examples just-given, and in others, it may be appropriate to score metadata for relevance. This can determine, e.g., the order (or other presentation) by which such information is displayed to users. Thus, for example, if images are discerned to be related due to temporal proximity, an image that is closest in time to the subject image will usually be given a higher relevance score than another image that is more remote in time. Likewise, metadata for the closest-in-time image will typically be scored higher in relevance than metadata for a more remote-in-time image. In a particular embodiment, a measure of semantic proximity is computed, and is used as the relevance score.

(An image extracted from a video can be watermarked to associate the video with the image—including identifying where in the video the image can be found. In some embodiments, a printer can work with a video file—extracting one or more images for printing (perhaps composited from several frames of video imagery)—and watermarking/registering each.)

The watermark identifiers can be assigned sequentially. More typical, however, is for identifiers to be structured with different fields, or ranges. For example, some bits—or value ranges—may be used to indicate which registry issued the identifier, which device (or whose device) requested issuance of the identifier, etc.

The foregoing description particularly considers mobile phone interaction with watermarked documents. However, other devices can be used, including the scanner portion of multi-function (scan/print/fax) devices, and game systems that include a camera component and network connectivity (e.g., the Nintendo dSI handheld game system). For example, a game system may be configured to link from a printed picture to an online blog about the subject of picture—to which viewers are invited to submit comments (which will then be presented to later viewers of the picture). A photo taken at a school prom, for example, may link to a blog of viewers' recollections about the event.

In some implementations, before requesting a watermark identifier from the registry (e.g., for embedding in an image to be printed), the image is first checked for the presence of a previous watermark. If one is found, the system may skip the requesting and watermarking operations. Alternatively, the system may request a watermark anyway, and embed it as a second watermark in the image. (The system may report the previous watermark to the registry, so the registry database can reflect that at least certain hardcopies bearing the previous watermark also bear the new watermark, and that all hardcopies bearing the new watermark also bear the previous watermark.)

If an image is to be re-sized for printing (or its resolution is to be changed), and it is found to have a pre-existing watermark, the watermark embedder may remove the pre-existing watermark, re-size the image, and then re-embed the re-sized image with a watermark identifier, i.e., the identifier formerly encoded by the removed watermark, or another one. (Some watermarks are straightforward to remove, as is familiar to artisans in the field. This generally involves extracting the watermark payload, creating a new pattern encoding that payload, and then subtracting that pattern from the encoded image (as contrasted with the usual addition of that pattern to an unencoded image)).

Although the detailed embodiments have focused on hardcopy photographs, the same principles are equally applicable to other printed documents (e.g., text), as well as to other forms of content (e.g., imagery displayed on theatrical screens and on electronic displays, etc.).

While particularly described in connection with image watermarking, similar functionality can be achieved by barcode-marking of imagery (albeit with impaired aesthetics). Likewise, image-fingerprinting can be used in lieu of watermarking if desired (albeit with less certain image identification).

Hybrid approaches can also be used, with part of the identification achieved by one means (e.g., watermarking), and part by another (e.g., image fingerprinting). For example, a watermark identifier may serve to associate a photograph with a particular creator, and fingerprint data may be used to identify a particular photograph within that creator's collection (and associate that photograph with corresponding metadata). Such arrangement greatly simplifies the problem of fingerprint matching that is onerous in other applications, since a relatively modest, bounded set of images—on the order of 10,000 or so—is involved.

If several images are visually similar, their fingerprints will be similar. Similar images identified in this fashion, and/or their metadata, may be presented for the user to select from. In the example of the sailboat pictures reviewed earlier, for example, imaging one hardcopy print may trigger an online experience (e.g., return of metadata) for that particular picture, with the software also inquiring whether the user would like to also see the responses for visually similar images.

Review

As will be recognized, the present disclosure details a great variety of inventive subject matter. A small subject of such subject matter is reviewed in the following paragraphs.

One inventive arrangement is a method in which an issuing authority receives a request that the authority assign an identifier for use with a first image, so the assigned identifier can later be encoded in the first image by digital watermarking. First fingerprint data corresponding to this first image is obtained, and a fingerprint data store is checked to identify a second image having fingerprint data that corresponds with said first fingerprint data, for which an identifier has already been issued. (As with all fingerprint techniques, exact identity of fingerprints is rare. The required degree of correspondence can be set by a numeric threshold, such as a Euclidean distance measure.)

This method further including either: (a) assigning, for use with the first image, the identifier earlier issued for use with the second image; or (b) assigning, for use with the first image, a new identifier. In this later case, a database record associated together the first identifier and the identifier earlier issued for use with the second image, so that the database indicates that the first content object and the former content object have fingerprint data that correspond.

The assigned identifier may be encoded in the first image by digital watermarking. Alternatively, another data conveyance mechanism, such as a barcode or an RFID chip, can be employed. The referenced fingerprint may comprise facial recognition data.

Another method involves receiving a request (e.g., at an issuing authority) to assign an identifier for use with a first content object (e.g., a first image). The identifier is assigned, and transmitted to a remote device. The method further includes checking to determine if an identifier has earlier been assigned to another content object having a perceptual similarity with the first content object.

If such checking determines that an identifier was earlier assigned, then the identifier assigned to the first content object can be associated together in a database with the identifier earlier assigned to the other content object, so that the database indicates that the first content object and the former content object have a perceptual similarity. Alternatively, the earlier-assigned identifier may be assigned (again) as the first identifier. With this latter approach, both the first content object and the former content object are assigned the same identifier.

In some embodiments, the checking is limited to content objects that are associated with the same proprietor. That is, if User A requests an identifier for user with the first content object, then only other content objects having User A as their proprietor are checked for perceptual similarity.

(The registry database can store, for each assigned identifier, data identifying the original proprietor of that content object. This data can comprise, e.g., a hash of the user's email address, phone number, and/or device MAC address, or other such identifying information. Devices associated with a particular proprietor can be similarly identified, and data associating such devices with the proprietor can be stored—in the registry database or elsewhere.)

In some implementations, the request for an identifier is accompanied by the content object itself (or a reduced resolution object, e.g., a thumbnail image). In such case, the receiving system may compute a fingerprint to check perceptual similarity. In other implementations, no content object is submitted with the request for an identifier (in which case fingerprint data may be sent with the request.)

Another method involves use of a hardware processor to decode an identifier from imagery captured by a mobile phone from a first printed or displayed image. (The hardware processor may be part of the mobile phone, or not.) This decoded identifier is transmitted to a registry. Through a user interface, the system receives from a user an identification of a second item of content with which the first imagery should be associated, where the second item of content includes a different image, video or audio content item. Information about this second item of content is then transmitted to the registry. This late-binding arrangement enables the first image to link to the second item of content, by reference to the registry.

Another method is similar, but involves the viewer side of the experience. A hardware processor decodes a first identifier from imagery captured from a first printed or displayed image by a mobile phone. This decoded first identifier is transmitted to a registry. As a consequence of such transmitting, the method further includes receiving data related to a second content item, where the second content item includes a different image, video or audio content item. (This second content item may be watermarked, with an identifier different than the first identifier.) Information based on such received data (e.g., the second content item itself, or related data) is then presented to a user through the mobile phone.

Still another arrangement is a system that includes a computer, a memory, and an interface for exchanging data with users. The memory includes a data structure associating a first image identifier with related information. More particularly, the data structure includes first information expressing a relationship between the first image and a different second image, where this relationship was indicated by a first user via data received through the interface from that first user. The data structure further includes second information expressing a relationship between the first image and a different third image, where this relationship was indicated by a second user via data received through the interface from that second user. The system is adapted to output, in response to a user's submission of the first image identifier, data relating to at least the second image. By such arrangement, the system defines a social network of imagery, which can be queried through the interface to enable exploration of imagery indicated—by different users—as being related to said first image.

This system may also be adapted to output—with the data relating to at least the second image—an identification of the first user who indicated a relationship between the first image and the second image.

Figure 5:
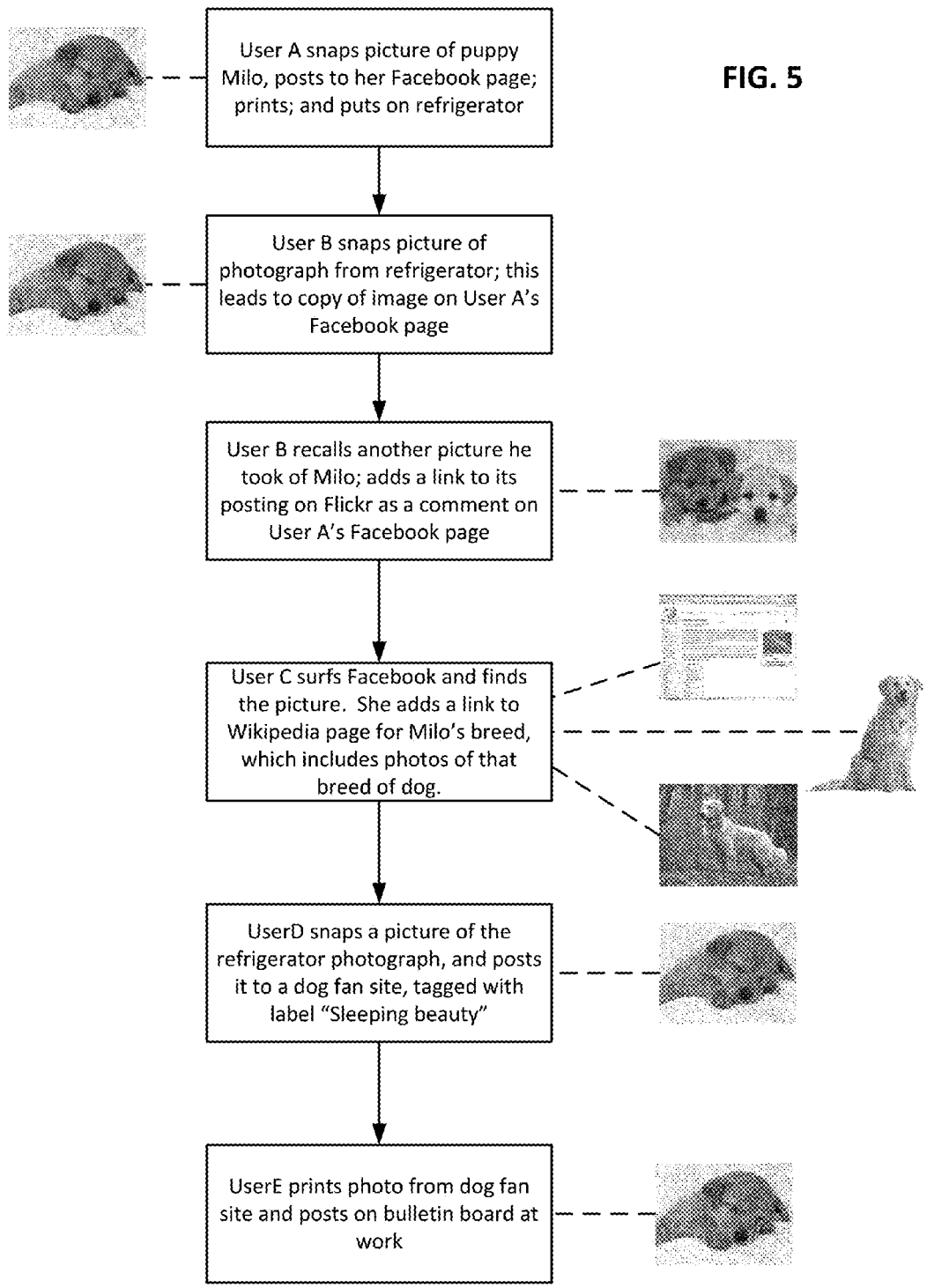
FIG. 5 details an illustrative usage scenario, involving a series of interactions rooted in an initial photo image.
Figure 7:
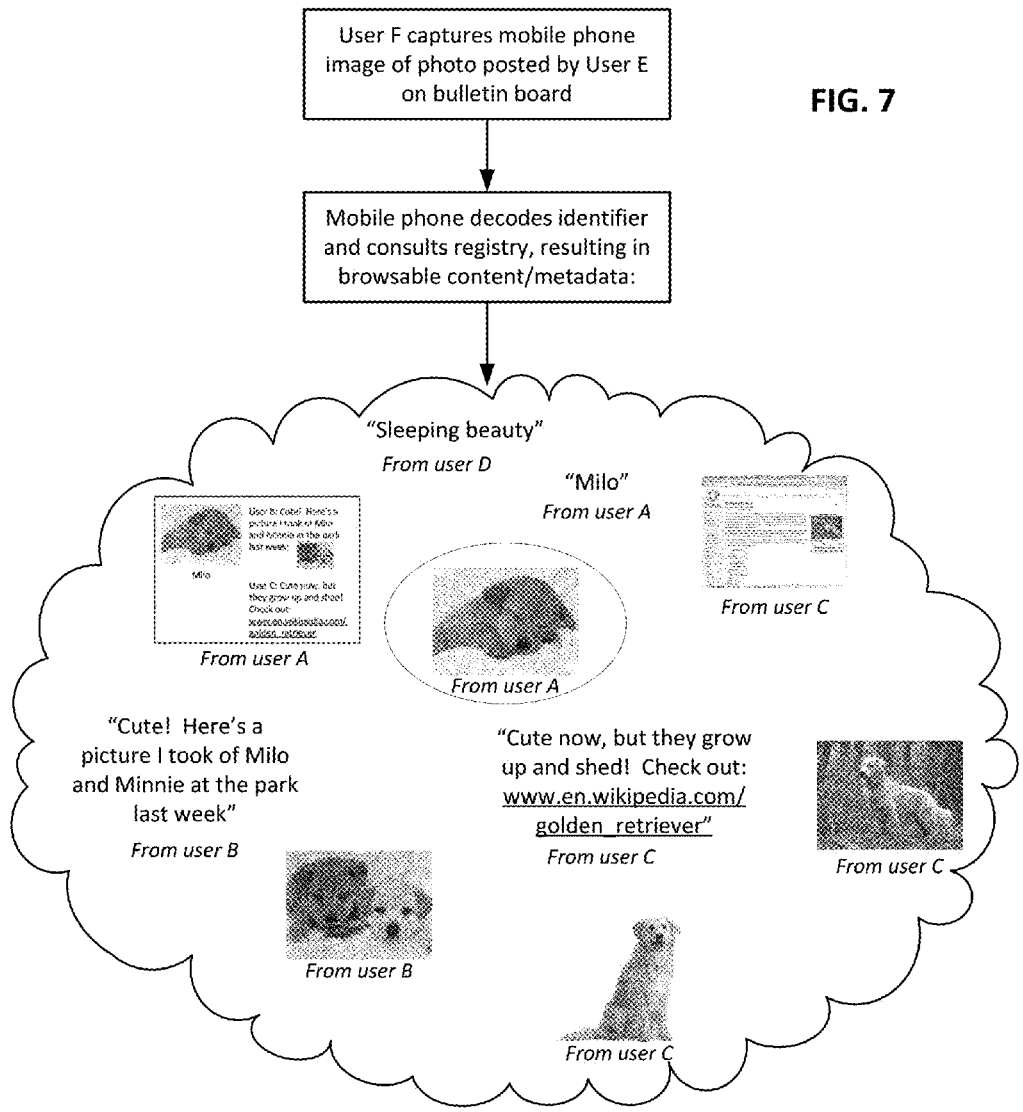
FIG. 7 shows a further usage scenario, continuing where FIG. 5 left off.

The foregoing arrangement may be made clearer by reference to FIGS. 5-7. In the depicted arrangement, User A snaps a picture of her Golden Retriever puppy ("Milo"), and posts the picture to her Facebook page. She also prints the photo from the Facebook page, and puts the hardcopy print on her refrigerator. (The print was steganographically watermarked—as detailed above—as a consequence of its printing, with the watermark payload linking to User A's Facebook page.)

User B visits User A, and views the print from the refrigerator using his mobile phone. This encounter leads User B's mobile phone to User A's Facebook page for the original image. User B recalls an image he'd earlier captured of Milo and his own dog Minnie, which he posted to Flickr. He gives Facebook a link to that photo (which Facebook then imports onto the comment page). User B comments on the additional photo with the text, "Cute! Here's a picture I took of Milo and Minnie at the park last week."

User C thereafter surfs User A's Facebook page, and finds the original Milo picture, as well as User B's added picture of Milo. User C adds a comment "Cute now, but they grow up and shed! Check out this link." User C then included a link to the Wikipedia page for Golden Retrievers. (That web page includes other images of that breed of dog.)

The Facebook web page then looks something like FIG. 6, with the original photo of Milo, together with comments added by Users B and C, and the further image posted by User B, and the Wikipedia link added by User C.

User D later snaps a picture of the hardcopy print on User A's refrigerator, and posts it to a web site devoted to Golden Retrievers—adding the tag "Sleeping beauty."

User E encounters User D's posting on the Golden Retriever web site, prints the image of Milo, and posts this hardcopy on a bulletin board at her work. (User E's printer recognized that the image already included a watermark, so did not embed a further watermark.)

Turning now to FIG. 7, User F captures a mobile phone image of the hardcopy picture posted by User E on the work bulletin board. User F's mobile phone decodes the watermark identifier from the image (as encoded when User A printed the image for her refrigerator). The phone consults the registry to determine what auxiliary content should be presented in connection with this image.

The registry includes a data structure, conceptually represented by the table of FIG. 8. It associates various metadata with the identifier originally assigned when User A printed the first hardcopy (98D28D478C34). This table includes, in its first row, a Uniform Resource Identifier (URI) comprising a web link (URL) to the Facebook page where User A originally posted the image of Milo. This web page includes the images, comments, and Wikipedia link shown in FIG. 6. Other metadata in this row indicates a particular user associated with this metadata (if known), and whether the URI points to a copy of the original image.

Each time an item of registry data is accessed in connection with a user view of a watermarked picture, some or all of the web destination(s) associated with that picture may be checked by the registry soon thereafter for the addition of other content or links that should be added to the registry entry for that watermark identifier. For example, when User B accessed the Facebook page, by viewing the refrigerator picture with his mobile phone, this prompted the registry to thereafter check the Facebook page for updates. This leads to the discovery that User B has added a comment, and a Flickr photo link. Information gleaned from such review can be added to the registry.

The second row of the FIG. 8 table gives the Flickr URL for the image of Milo and Minnie, which User B contributed for posting on User A's Facebook page, and which the registry thereafter discovered.

Instead of checking the linked URIs only when accessed, the registry may periodically scan all of linked URIs noted in its database, to harvest any other metadata that might have been added in association with such sites. By such a periodic scan (e.g., weekly), the registry discovered User C's annotation of the Facebook page with the "shed!" comment, and the link to Wikipedia. Such information is added to the registry entry for this watermark identifier, as shown in the third row of FIG. 8.

The fourth, fifth, and sixth rows give particular URLs for other Golden Labrador images found in the Wikipedia article. The registry found these further URLs when it checked the Wikipedia entry just-noted.

The last depicted row of the FIG. 8 table gives the URL to the Golden Retriever fan web site, to which User D posted a copy of the Milo picture. This item of metadata was contributed to the registry database by an automated web crawler that continuously examines pages across the web, identifies encoded watermarks, and reports its discoveries back to the registry (or to another service, which reports at least some of these discoveries back to the registry).

The web crawler reported back to the registry a link to the Milo image found on the Golden Retriever fan site, together with the watermark identifier discerned from that image. The registry added this information to its table for the Milo image. (The last column of this row indicates the URI points to a copy of the originally-watermarked image.)

Information from the FIG. 8 table is sent to User F's phone, which enables the phone to present a wealth of information through which User F can browse (e.g., by sweeping her finger across the phone's touchscreen—each sweep presenting a new item of associated information). Among the items presented are text entries excerpted from User A's web page, the image of Milo and Minnie contributed by User B, other Golden Labrador images from the Wikipedia web page (as well as the web page itself), etc.

Again, all of this content is compiled, and made available, without express user action. Yet the hardcopy print on User A's refrigerator led to the rich set of related information later presented to User F. (User F may add to the cycle, e.g., by posting further comments to User A's web page, or to one of the other online sites noted.)

Thus, another method involves decoding (e.g., using a programmed hardware processor) a first identifier (e.g., 98D28D478C34) from imagery captured by a mobile phone from a first printed or displayed image (e.g., the hardcopy of Milo posted on the work bulletin board). This first identifier is transmitted to a registry. As a consequence, linking data is returned. With this linking data, a mobile phone accesses at least one remote store (e.g., Facebook, Flickr, Wikipedia) containing content (e.g., images, comments) related to the image, where this content is compiled by one or more individuals (e.g., Users B, C, D) having an image-related connection back to a proprietor of the image. At least some of this content is rendered to a user of the mobile phone (e.g., User F). Thus, a crowd-sourced collection of content is identified by reference to the first identifier.

Concluding Remarks

Particularly contemplated mobile phones include the Apple iPhone 4, and smartphones following Google's Android specification (e.g., the Verizon Droid Eris phone, manufactured by HTC Corp., and the Motorola Droid 2 phone).

(Details of the iPhone, including its touch interface, are provided in Apple's published patent application 20080174570.)

The design of mobile phones and computers referenced in this disclosure is familiar to the artisan. In general terms, each includes one or more processors, one or more memories (e.g. RAM), storage (e.g., a disk or flash memory), a user interface (which may include, e.g., a keypad, a TFT LCD or OLED display screen, touch or other gesture sensors, a camera or other optical sensor, a compass sensor, a 3D magnetometer, a 3-axis accelerometer, one or more microphones, etc., together with software instructions for providing a graphical user interface), interconnections between these elements (e.g., buses), and an interface for communicating with other devices (which may be wireless, such as GSM, CDMA, W-CDMA, CDMA2000, TDMA, EV-DO, HSDPA, WiFi, WiMax, or Bluetooth, and/or wired, such as through an Ethernet local area network, a T-1 internet connection, etc).

Figure 3:
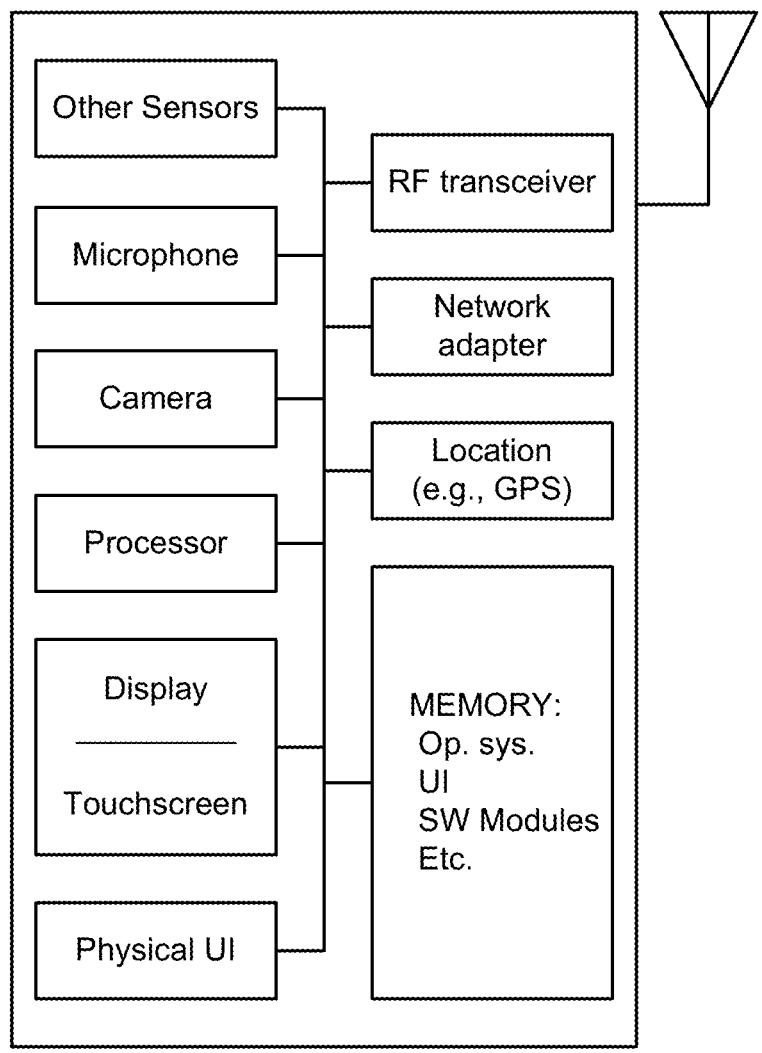
FIG. 3 shows a block diagram of an illustrative smartphone.
Figure 4:
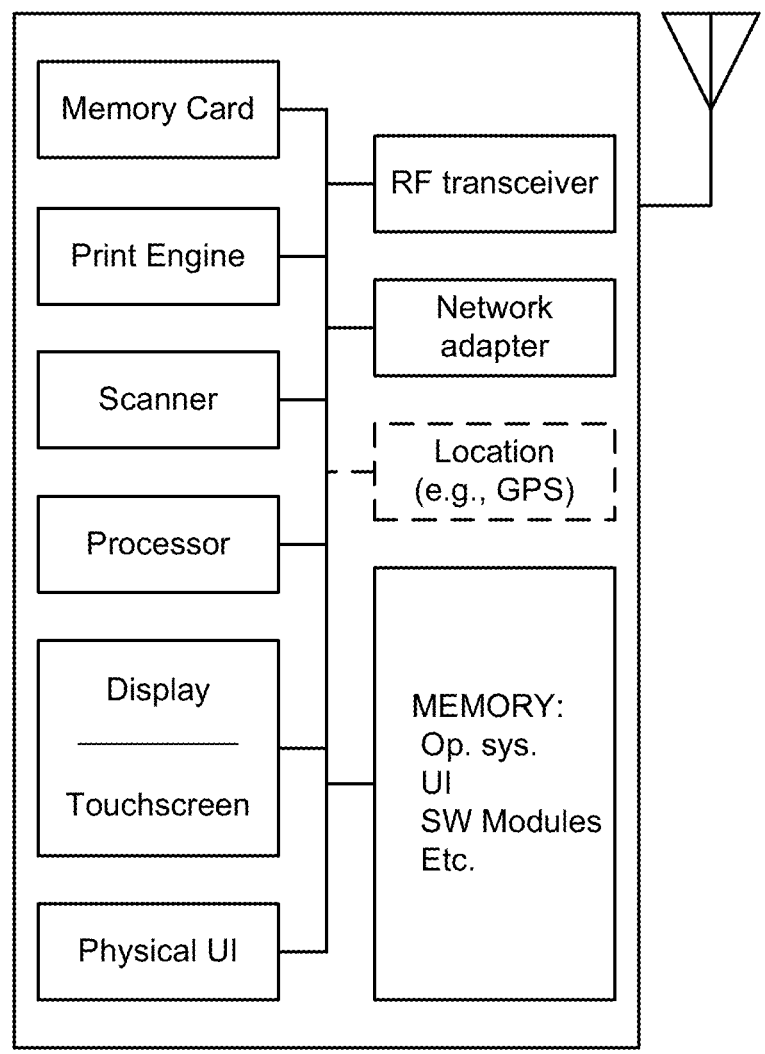
FIG. 4 shows a block diagraph of an illustrative multifunction printing device.

FIG. 3 shows a block diagram of a representative mobile phone. A block diagram of a representative printer is shown in FIG. 4. The two depicted devices have many elements in common, e.g., a processor, a display, a touchscreen and other physical user interface (UI) elements (buttons, etc.). Each further includes a network adapter for TCP/IP or other communication with other devices. The depicted devices also each includes a wireless (radio) interface, and a GPS-based location sensing unit. Each device further includes a memory that stores operating system software (including user interface software), application software modules, etc. Watermark encoding/decoding software can be included among these software modules.

Among the relatively few differences, the smartphone of FIG. 3 includes a camera and microphone, whereas the printer of FIG. 4 includes a scanner and a print engine.

While this specification earlier noted its relation to the assignee's previous patents and patent applications, it bears repeating. These disclosures should be read in concert and construed as a whole. Applicants intend that features and implementation details in each disclosure be combined and used in conjunction with such teachings in the others. Thus, it should be understood that the methods, elements and concepts disclosed in the present application be combined with the methods, elements and concepts detailed in those related applications. While some have been particularly detailed in the present specification, many have not—due to the large number of permutations and combinations. However, implementation of all such combinations is straightforward to the artisan from the provided teachings.

Elements and teachings within the different embodiments disclosed in the present specification are also meant to be exchanged and combined.

The processes and system components detailed in this specification may be implemented as instructions for computing devices, including general purpose processor instructions for a variety of programmable processors, including microprocessors (e.g., the Atom and A4), graphics processing units (GPUs, such as the nVidia Tegra APX 2600), and digital signal processors (e.g., the Texas Instruments TMS320 series devices), etc. These instructions may be implemented as software, firmware, etc. These instructions can also be implemented in various forms of processor circuitry, including programmable logic devices, field programmable gate arrays (e.g., the Xilinx Virtex series devices), field programmable object arrays, and application specific circuits—including digital, analog and mixed analog/digital circuitry. Execution of the instructions can be distributed among processors and/or made parallel across processors within a device or across a network of devices. Processing of content signal data may also be distributed among different processor and memory devices. As noted, "cloud" resources can be used as well. References to "processors," "modules" or "components" should be understood to refer to functionality, rather than requiring a particular form of implementation.

Software instructions for implementing the detailed functionality can be authored by artisans without undue experimentation from the descriptions provided herein, e.g., written in C, C++, Visual Basic, Java, Python, Tcl, Perl, Scheme, Ruby, etc. Mobile phones, printers, and other devices according to certain implementations of the present technology can include software modules for performing the different functions and acts.

Known browser software, communications software, and media processing software can be adapted for many of the uses detailed herein.

The service by which users ascribe certain attributes and experiences to content (e.g., through invocation of specified software) typically uses software on the user device—either in the OS or as application software. Alternatively, this service can be implemented—in part—using remote resources.

Software and hardware configuration data/instructions are commonly stored as instructions in one or more data structures conveyed by tangible media, such as magnetic or optical discs, memory cards, ROM, etc., which may be accessed across a network. Some embodiments may be implemented as embedded systems—a special purpose computer system in which the operating system software and the application software is indistinguishable to the user (e.g., as is commonly the case in basic cell phones). The functionality detailed in this specification can be implemented in operating system software, application software and/or as embedded system software.

As noted, different of the functionality can be implemented on different devices. For example, in a system in which a mobile phone communicates with a server at a remote service provider, different tasks can be performed exclusively by one device or the other, or execution can be distributed between the devices. Extraction of fingerprint and watermark data from content is one example of a process that can be distributed in such fashion. Thus, it should be understood that description of an operation as being performed by a particular device (e.g., a mobile phone or printer) is not limiting but exemplary; performance of the operation by another device (e.g., a remote server), or shared between devices, is also expressly contemplated.

(In like fashion, description of data being stored on a particular device is also exemplary; data can be stored anywhere: local device, remote device, in the cloud, distributed, etc.)

In actual practice, data structures used by the present technology may be distributed. For example, different registries may be employed by different users. A system may need to navigate a series of intermediate data structures (often hierarchical) to locate the one with needed information. (One suitable arrangement is detailed in Digimarc's U.S. Pat. No. 6,947,571.) Commonly accessed information may be cached at servers in the network—much like DNS data—to speed access.

While this disclosure has detailed particular ordering of acts and particular combinations of elements, it will be recognized that other contemplated methods may re-order acts (possibly omitting some and adding others), and other contemplated combinations may omit some elements and add others, etc.

Although disclosed as complete systems, sub-combinations of the detailed arrangements are also separately contemplated.

Reference was made to image fingerprinting. Various techniques are known to artisans in the field. One technique is robust hashing, e.g., as detailed in U.S. Pat. No. 6,671,407. Another is SURF, e.g., as utilized in the assignee's application 61/485,888, filed May 13, 2011. SURF is detailed, e.g., in Bay et al, "SURF: Speeded Up Robust Features," Eur. Conf. on Computer Vision (1), pp. 404-417, 2006; as well as Chen et al, "Efficient Extraction of Robust Image Features on Mobile Devices," Proc. of the 6th IEEE and ACM Int. Symp. On Mixed and Augmented Reality, 2007; and Takacs et al, "Outdoors Augmented Reality on Mobile Phone Using Loxel-Based Visual Feature Organization," ACM Int. Conf. on Multimedia Information Retrieval, October 2008.)

To provide a comprehensive disclosure, without unduly lengthening this specification, applicants incorporate-by-reference the patent applications and other documents referenced herein. (Such materials are incorporated in their entireties, even if cited above in connection with specific of their teachings.) These references disclose technologies and teachings that can be incorporated into the arrangements detailed herein, and into which the technologies and teachings detailed herein can be incorporated. The reader is presumed to be familiar with such prior work.

The invention claimed is:

1. A method comprising the acts: receiving a request to assign an identifier for use with a first content object represented by digital data; assigning an identifier for use with the first content object, and transmitting the assigned identifier to a remote device, the assignment of the identifier proceeding independently of the digital data representing the first content object; and checking to determine if an identifier has earlier been assigned to a former content object having a perceptual similarity with the first content object; wherein said request to assign the identifier occurs in connection with posting the first content object to a social networking service, or sending the first content object for printing.

2. The method of claim 1 that includes:
determining that an identifier has earlier been assigned to a former content object having a perceptual similarity with the first content object; and
associating together, in a database, an identifier assigned to the first content object, and the identifier earlier assigned to the former content object, so that the database indicates that the first content object and the former content object have a perceptual similarity.

3. The method of claim 1 that includes:
determining that an identifier has earlier been assigned to a former content object having a perceptual similarity with the first content object; and
assigning said earlier-assigned identifier as the first identifier, wherein both the first content object and the former content object are assigned the same identifier.

4. The method of claim 1 in which the first content object is associated with a first proprietor, and the checking comprises checking to see if an identifier has earlier been assigned to a former content object associated with said first proprietor.

5. The method of claim 1 that includes obtaining first fingerprint data associated with the first content object, and in which the checking comprises checking a data store for corresponding fingerprint data associated with a former content object.

6. The method of claim 5 wherein said received request does not also include the first content object itself, and wherein the method further includes receiving the fingerprint data corresponding to the first content object from a remote device.

7. The method of claim 5 wherein said received request includes the first content object itself, and wherein the method further includes computing the fingerprint data corresponding to the first content object.

8. The method of claim 1 wherein said fingerprint data comprises facial recognition data.

9. The method of claim 1 wherein the content object comprises data representing a photograph captured by a user's camera-equipped phone.

10. The method of claim 1 wherein the content object comprises a color image.

11. The method of claim 1 wherein the assigning comprising assigning the identifier sequentially.

12. The method of claim 1 wherein the assigning comprises assigning an identifier having different fields.

13. The method of claim 12 wherein one of said fields indicates a registry that issued the identifier, or a device that requested issuance of the identifier.

14. The method of claim 1 in which the identifier comprises an identifier that is to be steganographically digitally-watermarked into the first content object by said remote device.

15. An article of manufacture comprising a non-transitory computer readable medium having instructions stored thereon that, responsive to execution by a computer device, cause the computer device to perform actions including: receiving a request to assign an identifier for use with a first content object represented by digital data; assigning an identifier for use with the first content object, and transmitting the assigned identifier to a remote device, the assignment of the identifier proceeding independently of the digital data representing the object; and checking to determine if an identifier has earlier been assigned to a former content object having a perceptual similarity with the first content object wherein said request to assign the identifier occurs in connection with posting the first content object to a social networking service, or sending the first content object for printing.

16. The article of claim 15 in which said actions further include:
determining that an identifier has earlier been assigned to a former content object having a perceptual similarity with the first content object; and
associating together, in a database, an identifier assigned to the first content object, and the identifier earlier assigned to the former content object, so that the database indicates that the first content object and the former content object have a perceptual similarity.

17. The article of claim 15 in which said actions further include:
determining that an identifier has earlier been assigned to a former content object having a perceptual similarity with the first content object; and
assigning said earlier-assigned identifier as the first identifier, wherein both the first content object and the former content object are assigned the same identifier.

18. The article of claim 15 in which said actions include obtaining first fingerprint data associated with the first content object, and wherein the checking comprises checking a data store for corresponding fingerprint data associated with a former content object.

19. A method comprising the acts:
before a first image is digitally watermarked with a plural-bit payload, checking whether a perceptually-similar image has been previously digitally watermarked, said checking indicating that a perceptually-similar image has been previously digitally watermarked, said checking being performed by a hardware processor configured to perform such act;
determining a plural-bit payload that was previously used in digitally watermarking the perceptually-similar image; and
providing said determined plural-bit payload for use in digitally watermarking the first image;
wherein said determined plural-bit payload can be re-used, avoiding a need to use a different plural-bit payload in digitally watermarking the first image.

20. The method of claim 19 that further includes digitally watermarking the first image with said determined plural-bit payload.

21. The method of claim 19 wherein said checking comprises:
obtaining first fingerprint data corresponding to the first image; and
checking a fingerprint data store to identify a previously digitally watermarked image having fingerprint data that corresponds with said first fingerprint data.

22. A method comprising the acts:

in connection with digitally watermarking a first image using a first plural-bit payload, checking whether a perceptually-similar image has been previously digitally watermarked with a plural-bit payload, said checking indicating that a perceptually-similar image has been previously digitally watermarked with a plural-bit payload, said checking being performed by a hardware processor configured to perform such act;

determining a plural-bit payload with which said perceptually similar image was previously watermarked; and storing data in a data structure associating together the first plural-bit payload with said determined plural-bit payload;

wherein the determined plural-bit payload with which the perceptually-similar image was previously digitally watermarked is not re-used in digitally watermarking the first image, but its relationship to the first plural-bit payload is indicated by data stored in the data structure.

23. The method of claim 22 that further includes digitally watermarking the first image with the first plural-bit payload.

24. The method of claim 22 wherein said checking comprises:

obtaining first fingerprint data corresponding to the first image; and checking a fingerprint data store to identify a previously digitally watermarked image having fingerprint data that corresponds with said first fingerprint data.

25. The method of claim 1 wherein said request to assign the identifier occurs in connection with posting the first content object to a social networking service.

26. The method of claim 1 wherein said request to assign the identifier occurs in connection with sending the first content object for printing.

* * * * *